(12) United States Patent
Ojima

(10) Patent No.: US 6,236,412 B1
(45) Date of Patent: *May 22, 2001

(54) METHOD AND SYSTEM FOR SYNTHESIZING ACTUAL SCENE IMAGE AND GRAPHIC IMAGE

(75) Inventor: Satoru Ojima, Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,309

(22) Filed: May 8, 1998

(30) Foreign Application Priority Data

May 19, 1997 (JP) .................................................. 9-144676

(51) Int. Cl.[7] .................................................. G06T 17/00
(52) U.S. Cl. .................................................. 345/474; 345/435
(58) Field of Search .................................. 345/435, 474; 382/284, 291, 294, 199, 201, 203

(56) References Cited

U.S. PATENT DOCUMENTS

| | | | |
|---|---|---|---|
| 5,340,623 | * | 8/1994 | Menjo et al. ..................... 428/31 |
| 5,486,141 | * | 1/1996 | Ohga et al. ....................... 472/60 |
| 5,557,684 | * | 9/1996 | Wang et al. ..................... 382/107 |
| 5,566,251 | * | 10/1996 | Hanna et al. ................... 382/284 |
| 5,761,339 | * | 6/1998 | Ikeshoji et al. ................. 382/176 |

FOREIGN PATENT DOCUMENTS 7-93579   4/1995   (JP) .

* cited by examiner

*Primary Examiner*—Mark Zimmerman
*Assistant Examiner*—Mano Padmanabhan
(74) *Attorney, Agent, or Firm*—Arent, Fox, Kintner, Plotkin, Kahn, PLLC

(57) ABSTRACT

In an image data producing system, a calculating unit determines an object movement data indicating movement of a dummy object based on indicators of the dummy object of a first image data of a scene where the dummy object is moving. A model data producing unit produces a second image data of an object model which has the same movement as that of the dummy object, based on the object movement data. A synthesizing unit synthesizes the third image data of the scene where the dummy object is not present and the second image data to produce a fourth image data of the scene in which the object model is moving.

25 Claims, 5 Drawing Sheets

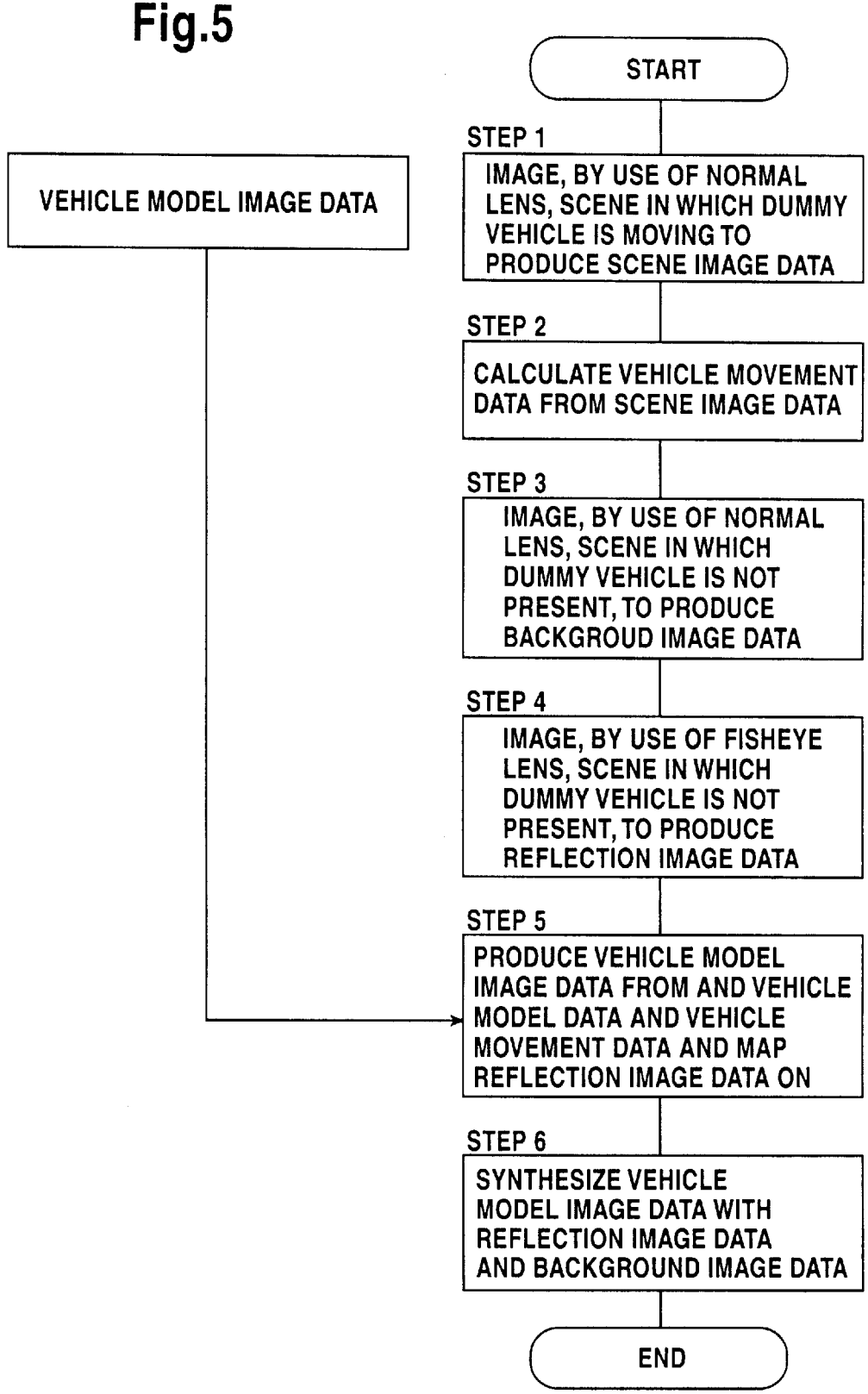

METHOD AND SYSTEM FOR SYNTHESIZING ACTUAL SCENE IMAGE AND GRAPHIC IMAGE

BACKGROUND SCENE OF THE INVENTION

1. Field of the Invention

The present invention relates to a method and system for generating an image, and more particularly to the technique that an actual scene image and an image produced by use of computer graphics are synthesized to produce a desired image.

2. Description of the Related Art

Conventionally, the design of a vehicle such as an automobile is important and is determined using various methods. For instance, a designed vehicle runs in a background scene, and then it is determined whether or not the design of the vehicle matches the background scene. Hereinafter, this is referred to as "background scene simulation".

The conventional background scene simulation is performed in the following procedure. That is, first, a designer designs the outer appearance of the vehicle. Next, a person who is called a modeler produces a large vehicle model of the actual size with clay based on this design. Colors and patterns are applied to the vehicle model, if necessary. On the other hand, a photograph of a background scene is prepared. Then, the vehicle model is located in front of the background scene photograph. Thus, it is determined whether or not the design of the vehicle model matches the background scene photograph.

The above procedure is repeated while the design of the vehicle model is modified. Thus, the design which matches the background scene most is finally adopted as the design of the vehicle. This method is effective to determine the design of the vehicle, which matches the background scene.

However, in this method, it is not possible to determine whether the vehicle running in the background scene matches the background scene, because the background scene and the vehicle model have stand still. Also, there is another problem in that the background scene simulation takes a great time, because the modification of the design of the vehicle model must be repeatedly performed.

By the way, in recent years, improvement of the performance of a computer and development of application technique are remarkable. Thus, the computer graphic technique is aggressively introduced into various fields. It is introduced in the design field of the vehicle. For example, a method is adopted in which an image is produced by use of the 3-dimensional computer graphics for the background scene simulation such that a vehicle model stands still in a background scene. According to this method, the above-mentioned problems can be eliminated, because it is not necessary to manufacture the vehicle model actually.

However, there is still another problem in that the still image of the vehicle model in the background scene is scarce in reality.

In addition, in Japanese Laid Open Patent Disclosure (JP-A-Heisei 7-93579), the technique is described in which an image of an "actual background scene" and an image of a vehicle mode produced by use of the 3-dimensional computer graphics are synthesized.

However, in this method, the actual background scene image and the vehicle model image are simply synthesized. Accordingly, there is a problem in that the vehicle model image does not match the actual background scene image so that the vehicle model image is seen to stand out from the actual background scene image, when the background scene simulation tries to be performed.

SUMMARY OF THE INVENTION

The present invention is accomplished to solve the above problems. Therefore, an object of the present invention is to provide a method and system for producing an image, in which the background scene simulation, which is wealthy in reality can be performed.

In order to achieve an aspect of the present invention, an image data producing system includes a scene data storage unit in which a first image data of a scene in which a dummy object is moving is stored, the object having indicators, a background data storage unit in which a second image data of the scene in which the dummy object is not present is stored, a calculating unit for determining an object movement data indicating movement of the dummy object based on the indicators of the dummy object of the first image data, a model data producing unit for producing a third image data of an object model which has the same movement as that of the dummy object, based on the object movement data, and a synthesizing unit for synthesizing the second image data and the third image data to produce a fourth image data of the scene in which the object model is moving.

The image data producing system may further include a model data storage unit in which a shape data of the object model is stored. In this case, the model data producing unit produces the third image data based on the object movement data and the shape data of the object model.

When the dummy object has at least three indicators, the calculating unit calculates three-dimensional movement of the dummy object in the first image data based on positions of the at least three indicators in the first image data to produce the object movement data.

The image data producing system may further include a reflection data storage unit in which a fifth image data of the scene in which the dummy object is not present and which is imaged by use of a fisheye lens is stored. In this case, the model data producing unit performs mapping the fifth image data on a portion of the third image data corresponding to a predetermined area of the object model.

The image data producing system may further include a reflection data storage unit in which a fifth image data of the scene in which the dummy object is not present and which is imaged by use of a fisheye lens is stored. In this case, the synthesizing unit performs mapping the fifth image data on a portion of the fourth image data corresponding to a predetermined area of the object model.

The image data producing system may further includes a camera which operates in response to operation control data, an instructing unit for generating the operation control data based on operations of a user, and a first storage processing unit for storing the first image data imaged by the camera in the scene data storage unit.

In this case, the image data producing system may further include a control data storage unit in which the operation control data is stored, and a second storage processing unit for controlling operations of the camera based on the operation control data stored in the control data storage unit when the dummy object is not present, and for storing the second image data imaged by the camera in the background data storage unit. Further, the image data producing system may include a reflection data storage unit in which a fifth image data, a third storage processing unit for controlling the operation of the camera with a fisheye lens based on the operation control data stored in the control data storage unit when the dummy object is not present, and for storing the fifth image data imaged by the camera in the reflection data storage unit. In this case, the synthesizing unit performs mapping of the fifth image data on a portion of the fourth image data corresponding to a predetermined area of the object model.

Alternatively, the image data producing system may further include an operation data storage unit in which an operation data indicating operations of the camera is stored, and a second storage processing unit for controlling operations of the camera based on the operation data stored in the operation data storage unit when the dummy object is not present, and for storing the second image data imaged by the camera in the background data storage unit. In this case, the image data producing system may further include a reflection data storage unit in which a fifth image data, and a third storage processing unit for controlling the operation of the camera with a fisheye lens based on the operation data stored in the operation data storage unit when the dummy object is not present, and for storing the fifth image data imaged by the camera in the reflection data storage unit. Also, the synthesizing unit performs mapping of the fifth image data on a portion of the fourth image data corresponding to a predetermined area of the object model.

In order to achieve another aspect of the present invention, a method of producing a desired image data in an image data producing system, includes the steps of:

determining an object movement data indicating movement of a dummy object based on indicators of the dummy object of a first image data of a scene in which a dummy object is moving;

producing a second image data of an object model which has the same movement as that of the dummy object, based on the object movement data; and synthesizing the second image data and a third image data of the scene in which the dummy object is not present, to produce a fourth image data of the scene in which the object model is moving.

In order to achieve still another aspect of the present invention, an image data producing system includes a scene data storage unit in which a first image data of a scene, a camera which operates in response to an operation control data, an instructing unit for generating the operation control data based on operations of a user, a first storage processing unit for storing the first image data of the scene imaged by the camera when the dummy object is moving in the scene, in the scene data storage unit, the object having indicators, a background data storage unit in which a second image data of the scene, a second storage processing unit for storing in the background data storage unit, the second image data of the scene imaged by the camera which is operated in a same manner as the first image data is obtained, when the object is not present in the scene, a calculating unit for determining an object movement data indicating movement of the object based on the indicators of the object of the first image data, a model data producing unit for producing a third image data of an object model which has a same movement as that of the object, based on the object movement data, and a synthesizing unit for synthesizing the second image data and the third image data to produce a fourth image data of the scene in which the object model moves.

In this case, the image data producing system may further include a reflection data storage unit in which a fifth image data of the scene in which the object is not present and which is imaged by use of a fisheye lens. The synthesizing unit performs mapping of the fifth image data on a portion of the fourth image data corresponding to a predetermined area of the object model.

In the image producing system of the present invention, the object and the object model can be a vehicle and a vehicle model respectively. However, the present invention is not limited to them. For instance, the object can be a ship, an aircraft, a rocket, a railway vehicle, an object running in a predetermined scene, and the object model can be one of the various models thereof.

For example, in the image producing system of the present invention, the vehicle running in a predetermined background scene is followed and imaged by a camera which is set in a predetermined point. The following operation of the vehicle is performed based on instructions from the instructing unit. In accordance with, the image of the background scene and the image of the vehicle running in the background scene are contained in the image which has been imaged through this imaging operation. The image is stored in the scene data storage unit.

Also, the operation control data indicative of the camera operation is stored in the control data storage unit at the same time as the imaging operation in relation to a time from an imaging start time. The operation control data is data corresponding to the instructions from the instructing unit. For example, the turned angles of the camera in the vertical or horizontal direction are contained in this operation control data.

Next, the operation control data is read from the above operation control data storage unit, and the camera is operated in accordance with the operation control data. Thus, the background scene in which the vehicle is not running is imaged by the camera. In accordance with, only the background scene is contained in the image which is obtained through the imaging operation. The change of the image of this background scene is the same as the change of the image of the background scene in which the vehicle is running. Thus, the image of this background scene without the vehicle is stored in the background data storage unit.

The calculating unit determines the object movement data from the image of the background scene in which the vehicle is running. The object movement data indicates the movement of the vehicle. For example, a speed, rolling angle, pitching angle, and yaw angle of the vehicle are contained in this object movement data. The model data producing unit produces the image of the vehicle model having the same movement as the above actual vehicle based on this object movement data, by use of the computer graphics. Then, the image of this vehicle model and the image of the background scene in which the vehicle is not running are synthesized. Thus, a desired image can be obtained as if the vehicle model is running in an actual scene.

In the image thus obtained, the background scene and the vehicle model match very correctly. Therefore, the problem of the conventional technique in that the vehicle can stand out from the background scene is eliminated.

Also, the design of the vehicle can be easily changed or modified because the image of the vehicle model is produced by use of the computer graphics. Accordingly, the background scene simulation can be performed using the actual background scene while changing the design of the vehicle model.

Further, if a plurality of background scenes have been previously imaged in various places based on the above camera operation data, the background scene simulation of the vehicle model which is running in the various places can be performed. Thus, the design of the vehicle becomes easy.

The image of the background scene may be imaged using the fish-eye lens and it may be used for a reflection image which is used to show that the background scene is reflected on the door, window, bonnet and so on of the vehicle. In this manner, since the image of the vehicle model having reality can be produced, the background scene simulation can be performed in the state which is nearer the actual scene.

Also, the object or vehicle has indicators for the movement detection, e.g., lamps, and the object movement data is calculated based on the change of the positions of the indicators. For example, as the above indicators for the movement detection, two marks are provided for the side of the vehicle, and four lamps are provided for a turret on the roof of the vehicle. The two marks are used to calculate an object distance, i.e., a distance from the camera to the vehicle. Also, four lamps are used together with a data indicative of the object distance to calculate object movement data.

BRIEF DESCRIPTION OF THE DRAWINGS

FIG. 5 is a diagram illustrating the process of producing a synthetic image in the present invention.

DESCRIPTION OF THE PREFERRED EMBODIMENTS

Next, the image producing system of the present invention will be described below in detail with reference to the attached drawings. The case that the object and the object model are a vehicle and a vehicle model, respectively, will be described.

Figure 2:
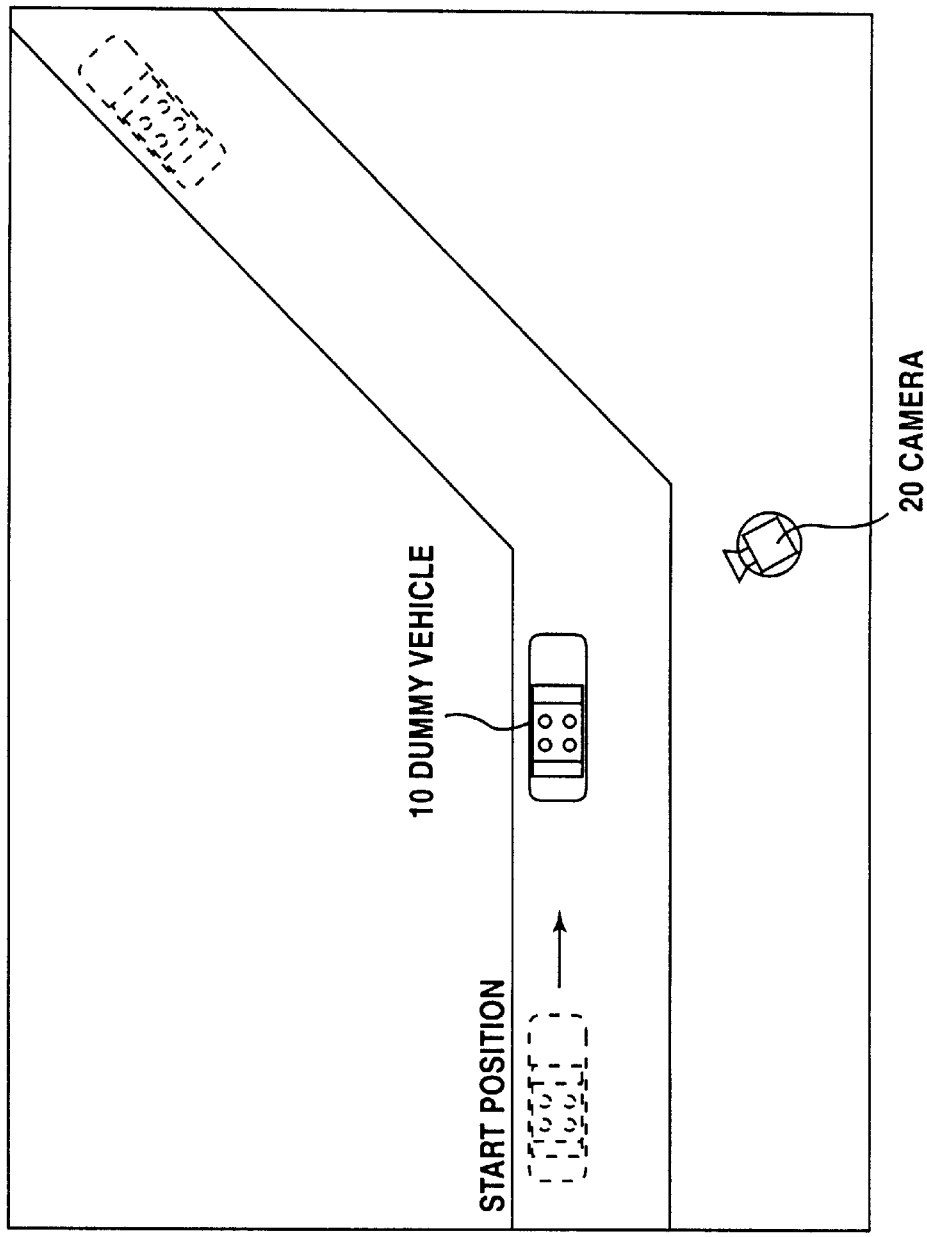
FIG. 2 is a diagram to describe the environment to which the image producing system according to the embodiment of the present invention is applied.
Figure 3:
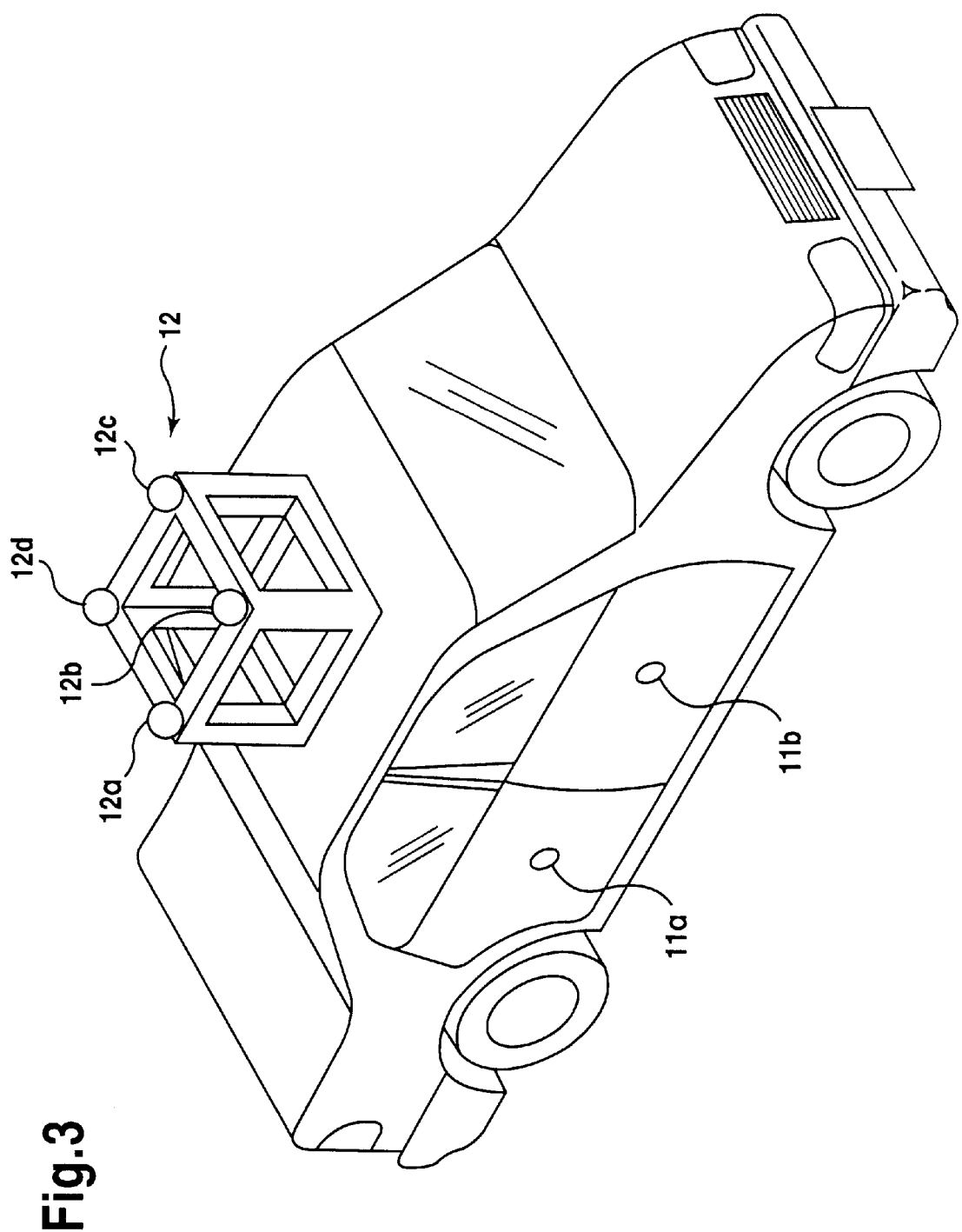
FIG. 3 is a diagram illustrating the structure of a dummy vehicle which is used in the image producing system according to the embodiment of the present invention.

FIG. 2 is a diagram to describe the environment for an image producing system according to an embodiment of the present invention. In FIG. 2, a dummy vehicle 10 runs in a background scene and it is imaged by a camera 20. A dummy vehicle 10 is used to calculate an object movement data. FIG. 3 shows the structure of the dummy vehicle 10. The dummy vehicle 10 is required to be the vehicle which is possible to run actually. There is no problem in how the design of the dummy vehicle 10 is.

The dummy vehicle 10 has marks 11a and 11b and lamps 12a, 12b, 12c and 12d as indicators. The lamps 12a, 12b, 12c and 12d are provided on a turret 12 at the four corners. Also, the marks 11a and 11b are provided on the side of the dummy vehicle 10. These marks 11a and 11b are used to calculate the object distance, i.e., the distance from a camera 20 to the dummy vehicle 10. For instance, the object distance is proportional to the number of pixels from the mark 11a to the mark 11b in the image imaged by the camera 20. Therefore, the dummy vehicle 10 is first imaged by the camera 20 in the state of the swing angle of 0 degree and the number of pixels from the mark 11a to the mark 11b at this time is counted as an initial object distance. Then, the object distances to the dummy vehicle at various positions are calculated based on the initial object distance, the swing angle of the camera 20, and the number of pixels from the mark 11a to the mark 11b at those times.

The turret 12 is installed in the roof of dummy vehicle 10. This turret 12 has the rectangular or cubic structure and the lamps 12a, 12b, 12c and 12d are installed in the four corners of the upper surface of the turret 12. These lamps 12a, 12b, 12c and 12d are used to calculate the object movement data indicative of the movement of the dummy vehicle 10 running. That is, the rolling angle, pitching angle, and yaw angle of the dummy vehicle 10 running are calculated based on the object distance and the position relation of the four lamps on the image. It should be noted that the lamps 12a and 12b may be used to calculate the object distance from the camera 20 to the dummy vehicle 10 instead of the above marks 11a and 11b. In this case, the above marks 11a and 11b are unnecessary.

In the above, the four lamps 12a, 12b, 12c and 12d are provided for the turret 12 in addition to the marks 11a and 11b. However, if at least three lamps are provided, the rolling angle, pitching angle, and yaw angle of the dummy vehicle 10 and the distance to the dummy vehicle 10 can be calculated from the position relation of three lamps.

Figure 4:
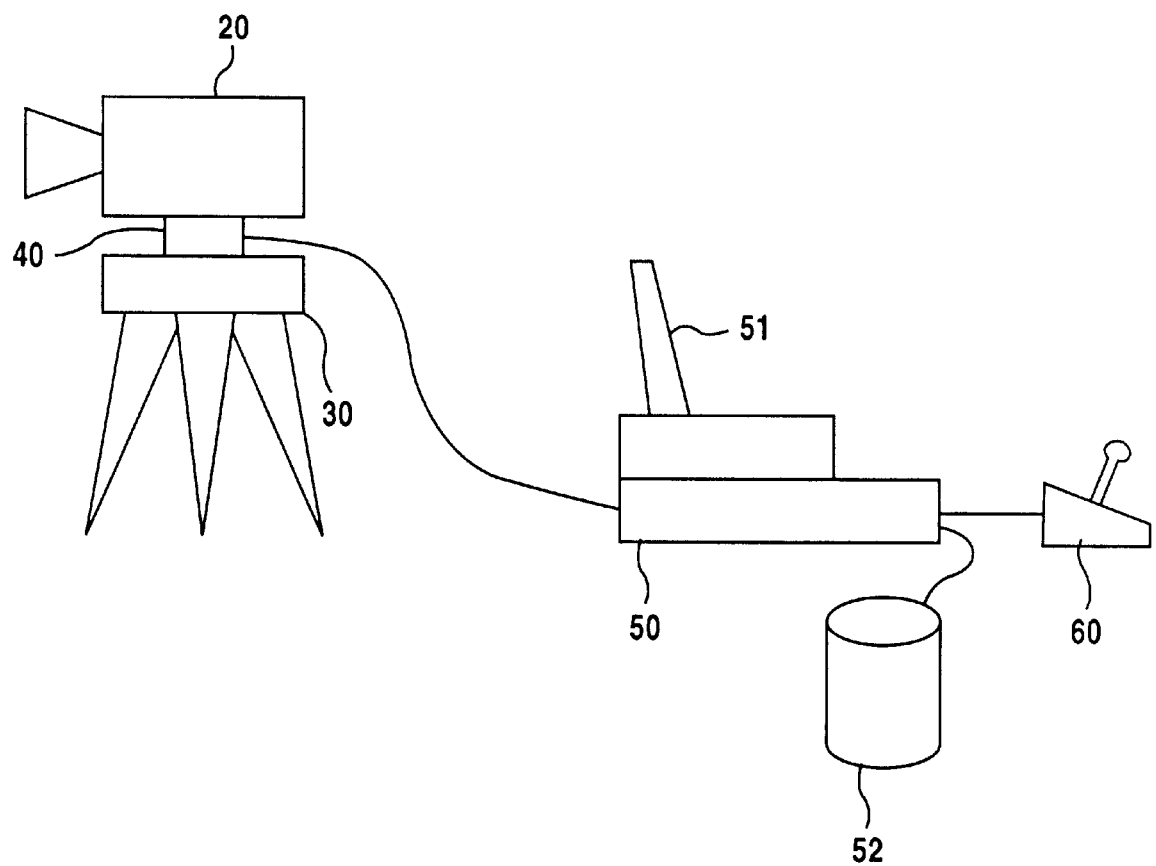
FIG. 4 is a diagram illustrating the structure of a motion control system which is used in the image producing system according to the embodiment of the present invention.

FIG. 4 shows the structure of the motion control system as a part of the image producing system. The motion control system is composed of the camera 20, a tripod 30, an actuator 40, a computer 50, a storage unit 52 and a joystick 60.

The camera 20 is used to image a scene and the lens to be used is exchangeable. In this embodiment, a usual lens is used to image an actual scene and a background scene and a fish-eye lens is used to image a reflection image. The image imaged by the camera 20 is supplied to the computer 50 as a video signal. The actuator 40 is provided on the tripod 30 on which the camera 20 is installed. The actuator 40 drives the camera 20 in accordance with an operation control data from the computer 50 such that the camera 20 is driven in angle into a vertical direction and a horizontal direction with respect to the camera installation point as a center point.

The computer 50 is provided with a monitor 51 and controls the whole of motion control system. The computer 50 is connected to a storage unit 52 and the joystick 60 in addition to above-mentioned camera 20. For example, as the storage unit 52, a hard disk unit, a floppy disk unit, an optical disk unit, an IC memory, and another rewritable storage medium can be used.

The computer 50 converts the video signal from the camera 20 into a digital signal and produces an image data with the rate of 30 frames/sec. It should be noted that if a digital camera is used for the camera 20, the above conversion is unnecessary, because the digital signal corresponding to the images is obtained from the camera 20. The produced image data is sent to the monitor 51 in order and is displayed on the monitor 51. Also, the image data is sent to the storage unit 52 in order and is stored therein as the image data.

The joystick 60 has a lever which is movable in up and down directions and left and right directions. The joystick 60 is used to instruct the movement of the camera 20. Operation data is generated in response to the operation of the joystick 60 and supplied to the computer 50. The computer 50 generates the operation control data used to drive the camera 20 actually based on the operation data. The generated operation control data is sent to the actuator 40 in order. Thus, the user can operate the joystick 60 while seeing the image imaged by the camera 20 and displayed on the monitor 51. Thus, the dummy vehicle 10 running can be followed such that the dummy vehicle 10 running in the background scene can be imaged.

Also, at the same time as the operation control data is sent to the actuator 40, the operation control data is related to the elapsed time from the start time of the imaging operation by the camera 20 and is stored in the storage unit 52. Thus, if the operation control data is read out from the storage unit 52 and supplied to the actuator 40 in relation to the time, the camera 20 can be operated in the same manner as described above without any operation of the joystick 60.

In the above description, the operation control data is the data for driving the camera 20. However, the operation instructions supplied from the joystick 60 may be related to the elapsed time from the imaging operation start time and may be stored in the storage unit. In this case, the operation instructions may be decoded so as to produce the operation control data which is supplied to the actuator 40 in relation to the time.

Figure 1:
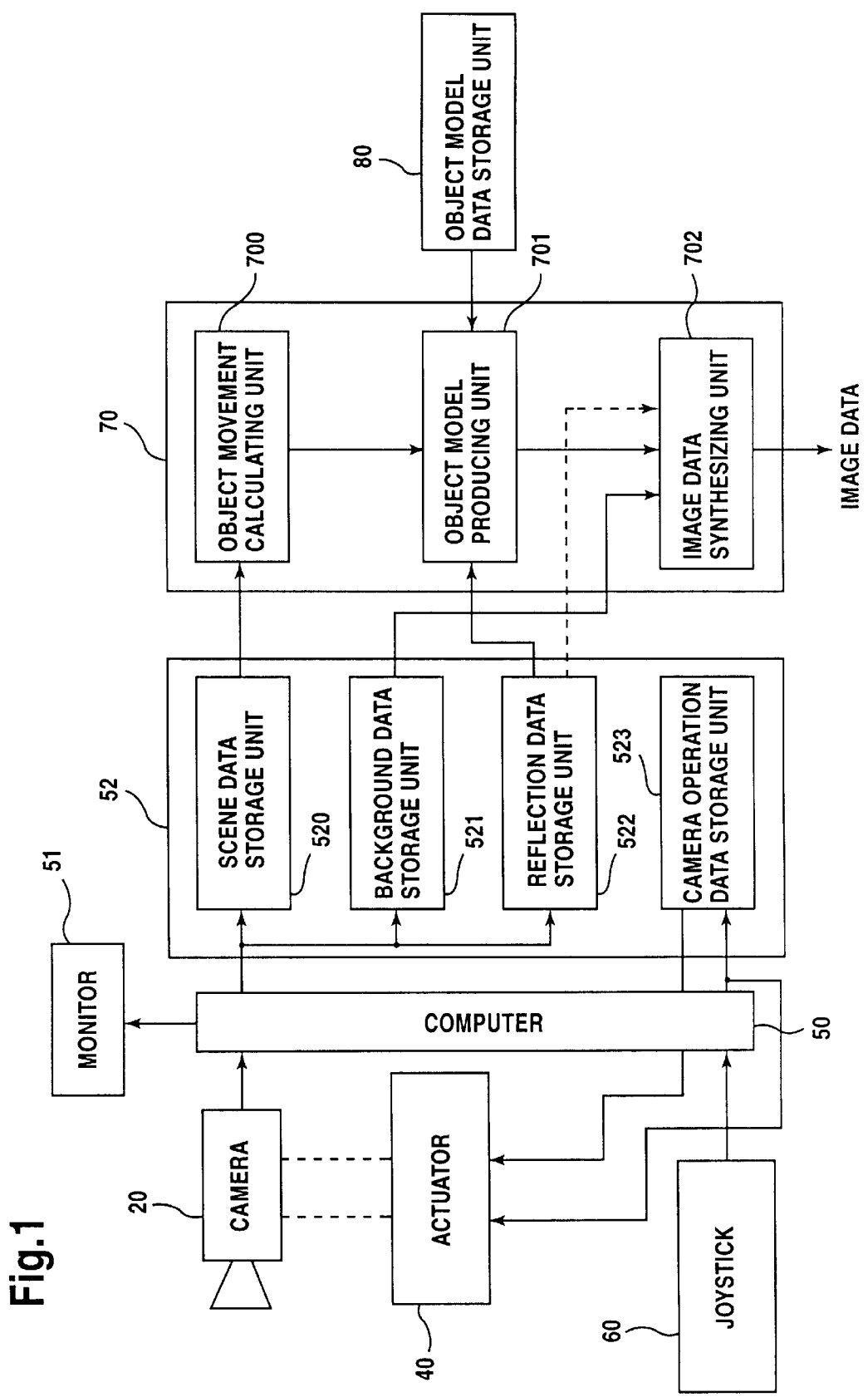
FIG. 1 is a block diagram illustrating the structure of an image producing system according to an embodiment of the present invention.

FIG. 1 is a block diagram illustrating the structure of the image producing system according to the embodiment of the present invention. The motion control system is contained in the image producing system as mentioned above. In accordance with, in the description in conjunction with FIG. 1, the same components as those of the motion control system shown in FIG. 4 are allocated with the same reference numerals, respectively. Thus, the description of the components will be omitted.

A processor 70 and a modeling data storage unit 80 connected with the processor 70 are added to the above-mentioned motion control system to form the image producing system. As the processor 70, the above computer 50 may be shared or an independent computer may be used. In case of the latter, the storage unit 52 is connected with the computer.

The storage unit 52 is composed of a scene data storage unit 520, a background data storage unit 521, a reflection data storage unit and a camera operation data storage unit 523. Also, the processor 70 is composed of an object movement calculating unit 700, an object model producing unit 701 and an image data synthesizing unit 702.

The scene data storage unit 520 stores the image data which is obtained by imaging the dummy vehicle 10 running in a predetermined background scene. The image data from the scene storage unit 520 is supplied to the object movement calculating unit 700 of the processor 70.

The background data storage unit 521 stores the image data which is obtained by imaging the above predetermined background scene without the vehicle running. The image data from the background data storage unit 521 is supplied to the image data synthesizing unit 702 of the processor 70.

The reflection storage unit 522 stores the image which was obtained by imaging the above removed predetermined background scene without the vehicle running using the fish-eye lens. The image from the reflection storage unit 522 is supplied to the object model producing unit 701 of the processor 70.

The camera operation data storage unit 523 stores the operation control data in accordance with the operations of the camera 20 which correspond to the operations of the joystick 60. For example, the camera operation data is the swing operation of the camera from 30 degrees of the left direction to 50 degrees of the right direction at the rotation rate of 2 degrees/sec. The operation control data is sent from the camera operation data storage unit 523 to the actuator 40. Thus, the operation of camera 20 can be controlled in response to the instructions from the user.

The object model data storage unit 80 stores a plurality of modeling data which respectively correspond to a plurality of designs of the vehicle model. Each modeling data is produced by a designer using a design system (not shown). The modeling data which is stored in the modeling data storage unit 80 is supplied to the object model producing unit 701 of the processor 70. By changing the modeling data to be supplied to the object model producing unit 701, the user can change the design image of the vehicle model which is produced by use of 3-dimension computer graphics.

The object movement calculating unit 700 calculates an object distance from the camera 20 to the dummy vehicle 10 and the object movement data based on the image data stored in the scene data storage unit 520, i.e., the image data obtained by imaging the dummy vehicle 10 running in the predetermined background scene. More specifically, the object movement calculating unit 700 calculates the object distance based on the number of pixels between the indicator 11a and the indicator 11b in the image.

Also, the object movement calculating unit 700 calculates the speed of the dummy vehicle 10 based on the number of pixels between the position of the lamp 12a and the position of another lamp 12b in the image data from the above scene data storage unit 520.

Moreover, the object movement calculating unit 700 calculates the rolling angle, pitching angle and yaw angle of the dummy vehicle 10 based on the position relation of the lamps 12a, 12b, 12c and 12d in the image data from the scene data storage unit 520 and the object distance. These object distances and the object movement data are supplied to the object model producing unit 701.

The object model producing unit 701 produces the image data of the vehicle at the rate of 30 frames/second based on the modeling data from the above object model data storage unit 80 and the object movement data from object movement calculating unit 700 by use of the 3-dimension computer graphics. The background portion of the produced image data of the vehicle is set to be blue for synthesis with the image data from the background data storage unit 521.

Also, in the object model producing unit 701, the processing which maps a reflection image on a vehicle model is performed. That is, the image data from the reflection data storage unit 522 is copied into the door, window and bonnet of the vehicle model. It should be noted that the image data of the vehicle model having reality is obtained by performing this processing, but the processing can be omitted. Also, the image data of the reflection may be supplied to the image data synthesizing unit 702 such that the reflection image data is synthesized together with the other image data. The image data produced by the object model producing unit 701 is supplied to the image data synthesizing unit 702.

The image synthesizing unit 702 synthesizes the image data of the background scene from the background data storage unit 521 and the image data of the vehicle model from the object model producing unit 701. The image data of the background scene and the image data of the vehicle model are synthesized to produce a new image of 30 frames per one second. The new image from the image data synthesizing unit 702 is supplied to a display unit (not shown) and displayed thereon. Thus, the image of the vehicle model running in the actual background scene is produced by use of the computer graphics.

Next, the procedure of producing the synthetic image in the above-mentioned structure will be described.

First, the camera 20 is attached with a usual lens and set to a predetermined position in a predetermined scene. Also, the dummy vehicle 10 is set in the start position. In this state, 3-dimensional measure is performed to determine the actual object distance by calculating the number of pixels between the mark 11a and the mark 11b. Also, a relative position relation in the image of four lamps 12a, 12b, 12c and 12d on the turret 12 is measured.

The data obtained through this three-dimensional measurement is used as the initial data to calculate the object movement data later. That is, the object movement data is determined based on the displacement quantity from this initial data.

Next, in a process 1, the dummy vehicle 10 is run from the start position. Then, the dummy vehicle 10 which is running in the background scene is followed by the camera 20 by moving by the joystick 60. The image data obtained through this imaging operation is stored in the scene data storage unit 520 of the storage unit 52. At this time, the operation control data is also generated based on the movement of the lever of the joystick 60 and is stored in the camera operation data storage unit 523 of the storage unit 52.

Next, in a process 2, the object movement calculating unit 700 of the processor 70 calculates the object movement data based on the image data of the dummy vehicle 10 running which has been stored in the scene data storage unit 520 of the storage unit 52. The calculation of the object movement data is performed every frame.

Next, in a process 3, the computer 50 sends to actuator 40 the operation control data which has been stored in the camera operation data storage unit 523 of the storage unit 52. The camera 20 is operated in the same manner as in the above process 1 and only the background scene where the dummy vehicle 10 is not running is imaged to produce the background scene image data. The image data obtained through this imaging operation is stored in the background data storage unit 521 of the storage unit 52.

Next, in the process 4, the lens of the camera 20 is exchanged into the fish-eye lens. Then, the computer 50 sends to actuator 40 the operation control data which has been stored in the camera operation data storage unit 523 of the storage unit 52. Thus, the camera 20 is operated in the same manner as in the above process 1. As a result, only the background scene without the dummy vehicle 10 is imaged by use of the fish-eye lens to produce the reflection image. The reflection image data obtained through the imaging operation is stored in the reflection data storage unit 522 of the storage unit 52.

Next, in the process 5, the object model producing unit 701 of the processor 70 produces the vehicle model data by use of the 3-dimensional computer graphics based on the modeling data from the object model data storage unit 80. The well-known image producing program for the 3-dimensional computer graphics can be used for this purpose. The image data of the vehicle model running in the background scene is produced based on the object movement data obtained in the above process 2. The vehicle model of the image data moves in the same manner as the dummy vehicle 10 moves. Also, a mapping may be performed to a part of the vehicle mode such that the reflection image data produced in the above process 4 copied to the part of the image data of the vehicle model.

Next, in a process 6, the image data synthesizing unit 702 of the processor 70 synthesizes the image data of the background scene without the dummy vehicle produced in the above process 3 and the image data of the vehicle model produced in the above process 3 are synthesized. This synthesizing operation is performed at the rate of 30 frames/second. Thus, the image data of the vehicle model running in the background scene produced by use of the 3-dimensional computer graphics is obtained.

In the above-mentioned explanation, the reflection image is mapped to the image data of the vehicle model in the process 5. However, the mapping operation of the reflection image to the part of the image data of the vehicle model may be performed as a part of the process 6 when the image data of the background scene and the image data of the vehicle model are synthesized in the process 6.

Because the image data of the vehicle model having reality can be produced according to this structure, the background scene simulation can be performed in the condition which is near the actual scene.

What is claimed is:

1. An image data producing system comprising:
   a scene data storage unit in which a first video data from a first recording with a camera of a scene where a dummy object is moving is stored;
   a background data storage unit in which a second video data from a second recording with a camera of said scene where said dummy object is not present is stored;
   a calculating unit for determining an object movement data indicating movement of said dummy object based on said first video data;
   a model data producing unit for producing a third image data of a object model which has the same movement as that of said dummy object, based on said object movement data; and
   a synthesizing unit for synthesizing said second video data and said third image data to produce a fourth video data of said scene where said object model is moving.

2. An image data producing system according to claim 1, further comprising a model data storage unit in which a design data of said object model is stored, and
   wherein said model data producing unit produces said third image data based on said object movement data and said design data of said object model.

3. An image data producing system according to claim 1, wherein said dummy object has at least three indicators, and
   wherein said calculating unit calculates three-dimensional movement of said dummy object in said first video data based on positions of said at least three indicators in said first video data to produce said object movement data.

4. An image data producing system according to claim 1, further comprising a reflection data storage unit in which a fifth image data of said scene in which said dummy object is not present and which is imaged by use of a fisheye lens is stored, and
   wherein said model data producing unit performs mapping said fifth image data on a portion of said third image data corresponding to a predetermined area of said object model.

5. An image data producing system according to claim 1, further comprising a reflection data storage unit in which a fifth image data of said scene in which said dummy object is not present and which is imaged by use of a fisheye lens is stored, and
   wherein said synthesizing unit performs mapping said fifth image data on a portion of said fourth video data corresponding to a predetermined area of said object model.

6. An image data producing system according to claim 1, further comprising:
   a camera which operates in response to operation control data;

an instructing unit for generating said operation control data based on operations of a user; and a first storage processing unit for storing said first video data imaged by said camera in said scene data storage unit.

7. An image data producing system according to claim 6, further comprising:

a control data storage unit in which said operation control data is stored; and a second storage processing unit for controlling operations of said camera based on said operation control data stored in said control data storage unit when said dummy object is not present, and for storing said second image data video by said camera in said background data storage unit.

8. An image data producing system according to claim 7, further comprising:

a reflection data storage unit in which a fifth image data;

a third storage processing unit for controlling said operation of said camera with a fish-eye lens based on said operation control data stored in said control data storage unit when said dummy object is not present, and for storing said fifth image data imaged by said camera in said reflection data storage unit, and wherein said synthesizing unit performs mapping of said fifth image data on a portion of said fourth video data corresponding to a predetermined area of said object model.

9. An image data producing system according to claim 6, further comprising:

an operation data storage unit in which operation data indicating operations of said camera is stored; and a second storage processing unit for controlling operations of said camera based on said operation data stored in said operation data storage unit when said dummy object is not present, and for storing said second video data imaged by said camera in said background data storage unit.

10. An image data producing system according to claim 9, further comprising :

a reflection data storage unit in which a fifth image data; and a third storage processing unit for controlling said operation of said camera with a fisheye lens based on said operation data stored in said operation data storage unit when said dummy object is not present, and for storing said fifth image data imaged by said camera in said reflection data storage unit, and wherein said synthesizing unit performs mapping of said fifth image data on a portion of said fourth video data corresponding to a predetermined area of said object model.

11. An image data producing system according to claim 1, wherein said dummy object has indicators, and wherein said calculating unit determines an object movement data indicating movement of said dummy object based on said indicators of said dummy object of said first video data.

12. A method of producing a desired image data in an image data producing system, comprising the steps of:

determining an object movement data indicating movement of a dummy object based on a first video data from a first recording with a camera of a scene in which the dummy object is moving;

producing a second image data of an object model which has the same movement as that of said dummy object, based on said object movement data; and synthesizing said second image data and a third video data from a second recording with said camera of said scene in which said dummy object is not present, to produce a fourth video data of said scene in which said object model is moving.

13. A method according to claim 12, wherein said producing step includes:

providing a shape data of said model object; and producing said third video data based on said object movement data and said shape data of said object model.

14. A method according to claim 12, wherein said object has at least three indicators, and wherein said calculating step includes calculating three-dimensional movement of said dummy object in said first video data based on positions of said at least three indicators in said first video data to produce said object movement data.

15. A method according to claim 12, further comprising the step of providing a fifth image data of said scene imaged by use of a fisheye lens, when said dummy object is not present, and wherein said synthesizing step further includes mapping said fifth image data on a portion of said fourth video data corresponding to a predetermined area of said object model.

16. A method according to claim 12, further comprising the step of providing a fifth image data of said scene imaged by use of a fisheye lens, when said dummy object is not present, and wherein said producing step further includes mapping said fifth image data on a portion of said second image data corresponding to a predetermined area of said object model.

17. A method according to claim 12, further comprising:

generating operation control data based on operations of a user;

operating a camera in response to said operation control data such that said first video data imaged by said camera is obtained.

18. A method according to claim 17, further comprising the step of:

controlling operations of said camera based on said operation control data when said dummy object is not present such that said third video data imaged by said camera is obtained.

19. A method according to claim 18, further comprising the steps of:

controlling said operations of said camera with a fisheye lens based on said operation control data when said dummy object is not present, such that a fifth image data imaged by said camera is obtained; and mapping said fifth image data on a portion of said second image data corresponding to a predetermined area of said object model.

20. A method according to claim 17, further comprising the step of controlling operations of said camera based on operation data indicating said operations of said camera for obtaining said first video data when said dummy object is not present such that said third video data imaged by said camera is obtained.

21. A method according to claim 20, further comprising the steps of:

controlling said operations of said camera with a fisheye lens based on said operation data when said dummy object is not present such that a fifth image data of said scene imaged by said camera with said fisheye lens is obtained; and mapping said fifth image data on a portion of said second image data corresponding to a predetermined area of said object model.

22. A method according to claim 12, wherein said dummy object has indicators, and wherein said determining step includes:

determining said object movement data indicating movement of said dummy object based on said indicators of said dummy object of said first video data from said first recording of said scene in which said dummy object is moving.

23. An image data producing system comprising:

a scene data storage unit in which a first video data from a first recording with a camera of a scene in which a dummy object is moving is stored;

the camera operates in response to an operation control data;

an instructing unit for generating said operation control data based on operations of a user;

a first storage processing unit for storing said first video data of said scene imaged by said camera when the dummy object is moving in said scene, in said scene data storage unit;

a background data storage unit in which a second video data from a second recording with the camera of a scene without the dummy object is stored;

a second storage processing unit for storing in said background data storage unit, said second video data of said scene imaged by said camera which is operated in a same manner as said first video data is obtained, when said object is not present in said scene;

a calculating unit for determining an object movement data indicating movement of said dummy object based on said first video data;

a model data producing unit for producing a third image data of an object model which has a same movement as that of said dummy object, based on said object movement data; and a synthesizing unit for synthesizing said second video data and said third image data to produce a fourth image data of said scene in which said object model moves.

24. An image data producing system according to claim 23, further comprising a reflection data storage unit in which a fifth image data of said scene in which said dummy object is not present and which is imaged by use of a fisheye lens, and wherein said synthesizing unit performs mapping of said fifth image data on a portion of said fourth image data corresponding to a predetermined area of said object model.

25. An image data producing system according to claim 23, wherein said object has indicators, and wherein said calculating unit determines said object movement data indicating movement of said dummy object based on said indicators of said object of said first video data.

* * * * *